United States Patent
Roberts et al.

(10) Patent No.: US 11,029,242 B2
(45) Date of Patent: Jun. 8, 2021

(54) INDEX SORTING SYSTEMS AND METHODS

(71) Applicant: Becton, Dickinson and Company, Franklin Lakes, NJ (US)

(72) Inventors: David A. Roberts, San Jose, CA (US); Christopher J. Wolf, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 679 days.

(21) Appl. No.: 15/841,161

(22) Filed: Dec. 13, 2017

(65) Prior Publication Data

US 2018/0356331 A1 Dec. 13, 2018

Related U.S. Application Data

(60) Provisional application No. 62/518,512, filed on Jun. 12, 2017.

(51) Int. Cl.
| | | |
|---|---|---|
| *G01N 33/48* | (2006.01) | |
| *G01N 33/50* | (2006.01) | |
| *G01N 15/14* | (2006.01) | |
| *G01N 21/64* | (2006.01) | |
| *G06F 16/904* | (2019.01) | |

(Continued)

(52) U.S. Cl.
CPC ......... *G01N 15/1431* (2013.01); *G01N 15/10* (2013.01); *G01N 15/1425* (2013.01); *G01N 15/1436* (2013.01); *G01N 21/645* (2013.01); *G01N 21/6428* (2013.01); *G06F 3/04842* (2013.01); *G06F 16/2237* (2019.01); *G06F 16/904* (2019.01); *G06F 16/907* (2019.01); *G06T 11/206* (2013.01); *G01N 2015/1006* (2013.01); *G01N 2015/1081* (2013.01);

(Continued)

(58) Field of Classification Search
CPC .......... G01N 15/1431; G01N 21/6428; G01N 2015/149; G01N 2015/1006; G05B 2219/40447
See application file for complete search history.

(56) References Cited

U.S. PATENT DOCUMENTS

| | | |
|---|---|---|
| 4,845,653 A | 7/1989 | Conrad et al. |
| 5,627,040 A | 5/1997 | Bierre et al. |

(Continued)

OTHER PUBLICATIONS

Hinks et al. Parallel implementation for image rotation using parallel virtual machine. Canadian Conference on Electrical and Computer Engineering, pp. 1297-1301. (Year: 2002).*

Metadata for "Hinks et al. Parallel implementation for image rotation using parallel virtual machine. Canadian Conference on Electrical and Computer Engineering, pp. 1297-1301." (Year: 2020).*

BD Biosciences, BD FACSAria II User's Guide, Mar. 2009.

(Continued)

*Primary Examiner* — Russell S Negin
(74) *Attorney, Agent, or Firm* — Peter W. Schroen; Bret E. Field; Bozicevic, Field & Francis LLP

(57) ABSTRACT

Features for a quantitative biological data analysis system are described. Index sort analysis can be performed using sort electronics on a flow cytometer or other particle analysis system or after an experiment using a workstation. The sort electronics on the cytometer or other particle analysis system may generate sort decision information for the events. The sort decision information may be transmitted from the sort electronics to the workstation that may differ from the sort identified by the workstation. The feature fuse the gate information with the sorting decision information to provide an accurate representation of the sorting.

22 Claims, 11 Drawing Sheets

(51) Int. Cl.
  *G06F 16/907* (2019.01)
  *G06F 16/22* (2019.01)
  *G01N 15/10* (2006.01)
  *G06F 3/0484* (2013.01)
  *G06T 11/20* (2006.01)

(52) U.S. Cl.
  CPC ............... *G01N 2015/1402* (2013.01); *G01N 2015/149* (2013.01); *G01N 2201/12* (2013.01)

(56) References Cited

U.S. PATENT DOCUMENTS

| | | | |
|---|---|---|---|
| 5,739,000 | A | 4/1998 | Bierre et al. |
| 5,795,727 | A | 8/1998 | Bierre et al. |
| 5,962,238 | A | 10/1999 | Sizto et al. |
| 6,014,904 | A | 1/2000 | Lock |
| 6,944,338 | B2 | 9/2005 | Lock et al. |
| 7,679,039 | B2 | 3/2010 | Van Den et al. |
| 9,567,645 | B2 | 2/2017 | Fan et al. |
| 2003/0187716 | A1 | 10/2003 | Lee |
| 2008/0241820 | A1 | 10/2008 | Krutzik |
| 2010/0042351 | A1 | 2/2010 | Covey et al. |
| 2010/0138774 | A1 | 6/2010 | Crosbie |
| 2011/0065193 | A1 | 3/2011 | Kitagawa et al. |
| 2012/0245889 | A1 | 9/2012 | Zhu et al. |
| 2013/0226469 | A1 | 8/2013 | Robinson et al. |
| 2018/0253194 | A1 | 9/2018 | Javadi |

OTHER PUBLICATIONS

Irturk et al., "An FPGA Design Space Exploration Tool for Matrix Inversion Architectures", IEEE Symposium on Application Specific Processors (SASP), Jun. 2008.

Lin et al., "A Model for Matrix Multiplication Performance on FPGAs", IEEE Computer Society, 978-0-7695-4529-5/11, Oct. 2011.

Macosko et al., "Highly parallel genome-wide expression profiling of individual cells using nanoliter droplets", HHS Public Access, May 21, 2015; 161(5): 1202-1214. doi:10.1016/j.cell.2015.05.002.

Shekhar et al., "Automatic Classification of Cellular Expression by Nonlinear Stochastic Embedding (ACCENSE)", PNAS, vol. 111, No. 1, pp. 202-207, dated Nov. 19, 2013.

BD Biosciences, "BB FACSAria II User's Guide", www.bdbiosciences.com, published 2007 (revised 2009), 344 pages.

Irturk et al, "An FPGA Design Space Exploration Tool for Matrix Inversion Architectures", IEEE Symposium on Application Specific Processors (SASP), 2008, 6 pages.

Lin et al, "A Model for Matrix Multiplication Performance on FPGAs", IEEE Computer Society, 978-0-7695-4529-5/11, 2011, pp. 305-310.

Macosko et al, "Highly parallel genome-wide expression profiling of individual cells using nanoliter droplets", Cell, 2015; 161(5), pp. 1202-1214.

Shekhar et al, "Automatic Classification of Cellular Expression by Nonlinear Stochastic Embedding (ACCENSE)", PNAS, 2014, 111, (1), pp. 202-207.

* cited by examiner

INDEX SORTING SYSTEMS AND METHODS

CROSS-REFERENCE TO RELATED APPLICATIONS

The application claims priority to U.S. Provisional Application No. 62/518,512, filed on Jun. 12, 2017, which is incorporated by reference in its entirety. Any and all priority claims identified in the Application Data Sheet, or any correction thereto, are also hereby incorporated by reference under 37 C.F.R. § 1.57.

FIELD

The present application generally relates to index sorting systems and methods, specifically index sorting systems and methods for analysis of quantitative biological event data.

BACKGROUND

Particle analyzers, such as flow and scanning cytometers, are analytical tools that enable the characterization of particles on the basis of optical parameters such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one for each of the distinct dyes to be detected are included in the analyzer. The data obtained comprise the signals measured for each of the light scatter parameters and the fluorescence emissions.

Cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured parameters. The use of standard file formats, such as an "FCS" file format, for storing data from a flow cytometer facilitates analyzing data using separate programs and/or machines. Using current analysis methods, the data typically are displayed in 2-dimensional (2D) plots for ease of visualization, but other methods may be used to visualize multidimensional data.

The parameters measured using a flow cytometer typically include the excitation light that is scattered by the particle along a mostly forward direction, referred to as forward scatter (FSC), the excitation light that is scattered by the particle in a mostly sideways direction, referred to as side scatter (SSC), and the light emitted from fluorescent molecules in one or more channels (range of frequencies) of the spectrum, referred to as FL1, FL2, etc., or by the fluorescent dye that is primarily detected in that channel. Different cell types can be identified by the scatter parameters and the fluorescence emissions resulting from labeling various cell proteins with dye-labeled antibodies.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, wherein each cell corresponds to a point in a multi-dimensional space defined by the parameters measured. Populations of cells or particles are identified as clusters of points in the data space. The identification of clusters and, thereby, populations can be carried out manually by drawing a gate around a population displayed in one or more 2-dimensional plots, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; and 6,944,338; and U.S. Pat. Pub. No. 2012/0245889, each incorporated herein by reference.

Flow cytometry is a valuable method for the analysis and isolation of biological particles such as cells and constituent molecules. As such it has a wide range of diagnostic and therapeutic applications. The method utilizes a fluid stream to linearly segregate particles such that they can pass, single file, through a detection apparatus. Individual cells can be distinguished according to their location in the fluid stream and the presence of detectable markers. Thus, a flow cytometer can be used to produce a diagnostic profile of a population of biological particles.

Isolation of biological particles has been achieved by adding a sorting or collection capability to flow cytometers. Particles in a segregated stream, detected as having one or more desired characteristics, are individually isolated from the sample stream by mechanical or electrical removal. This method of flow sorting has been used to sort cells of different types, to separate sperm bearing X and Y chromosomes for animal breeding, to sort chromosomes for genetic analysis, and to isolate particular organisms from complex biological population.

SUMMARY

One general aspect includes a computer-implemented method performed under control of one or more electronic processors. The computer-implemented method includes receiving, at a workstation from a memory, experiment information identifying: a first sort gate; a first plate destination for particles identified within the first sort gate on a collection plate; a second sort gate; and a second plate destination for particles identified within the second sort gate on the collection plate. The computer-implemented method includes generating, at the workstation, a first index sort inclusion bitmap identifying first plate locations on the collection plate using the first sort gate. The computer-implemented method includes generating, at the workstation, a second index sort inclusion bitmap identifying second plate locations on the collection plate using the second sort gate. The computer-implemented method includes receiving, at the workstation, event data for the particles, the event data including for each particle a fluorescent parameter value and a sort decision of a sorting device. The computer-implemented method includes determining, via the workstation, that an individual fluorescent parameter value for an individual particle included in the particles is within the first sort gate. The computer-implemented method includes associating the individual particle with the first sort gate for presentation via a user interface. The computer-implemented method includes determining, via the workstation, that an individual sort decision for the individual particle corresponds to the second sort gate based at least in part on a comparison between the individual sort decision and the second index sort inclusion bitmap. The computer-implemented method includes associating the individual particle with the second sort gate for presentation via the user interface.

Implementations of the computer-implemented method may include one or more of the following features. The computer-implemented method where the sort decision is generated by a sorting device configured to sort the particles into the collection plate based at least in part on the experiment information. The computer-implemented method further including: receiving, at the workstation, a geometric shape defining the first sort gate, where the geometric shape is pixelated. The computer-implemented method further including: receiving, at the workstation, a request to adjust an axis for a geometric shape defining the first sort gate, where the geometric shape, after the axis is adjusted, is pixelated. The computer-implemented method where the request includes a binomial transformation to adjust the axis. The computer-implemented method where the first sort gate identifies a set of particles having parameter values distinct from another set of particles identified by the second sort gate.

One general aspect includes an apparatus including: a particle analyzer (such as a flow cytometer) configured to acquire quantitative biological event data (e.g., flow cytometric event data). The apparatus also includes one or more processors in communication with the particle analyzer, the one or more processors configured to: receive, from a memory, experiment information identifying: a first sort gate; a first plate destination for particles identified within the first sort gate; a second sort gate; and a second plate destination for particles identified within the second sort gate. The one or more processors are configured to generate a first index sort inclusion bitmap uniquely identifying the first sort gate. The one or more processors are configured to generate a second index sort inclusion bitmap uniquely identifying and the second sort gate. The one or more processors are configured to receive, from the particle analyzer, event data for the particles, the event data including for each particle a fluorescent parameter value and a sort decision. The one or more processors are configured to determine that an individual fluorescent parameter value for an individual particle included in the particles is within the first sort gate. The one or more processors are configured to associate the individual particle with the first sort gate for presentation via a user interface. The one or more processors are configured to determine that an individual sort decision for the individual particle corresponds to the second sort gate based at least in part on a comparison between the individual sort decision and the second index sort inclusion bitmap. The one or more processors are configured to associate the individual particle with the second sort gate for presentation via the user interface.

Implementations of the apparatus may include one or more of the following features. The apparatus where the sort decision is generated by the particle analyzer, where the particle analyzer is configured to sort the particles into the plate based at least in part on the experiment information. The apparatus where the one or more processors are further configured to: receive a geometric shape defining the first sort gate, where the geometric shape is pixelated. The apparatus where the one or more processors are further configured to: receive a request to adjust an axis for a geometric shape defining the first sort gate, where the geometric shape, after the axis is adjusted, is pixelated. The apparatus where the request includes a non-linear transformation to adjust the axis. The apparatus where the first sort gate identifies a set of particles having parameter values distinct from another set of particles identified by the second sort gate. The apparatus where the one or more processors are further configured to: cause display of a graphic representation of the plate, the graphic representation of the plate including a first area representing the second plate destination; and cause display of a graphic indicator for the individual particle within the first area.

One general aspect includes a computer-readable medium having stored thereon instructions which when executed by a processor of a device, cause the device to at least: receive, from a memory, experiment information identifying: a first sort gate; a first plate destination for particles identified within the first sort gate; a second sort gate; and a second plate destination for particles identified within the second sort gate. Instructions are also included to generate a first index sort inclusion value uniquely identifying the first sort gate. Instructions are also included to generate a second index sort inclusion value uniquely identifying and the second sort gate. Instructions are also included to receive, from a particle analyzer, event data for the particles, the event data including for each particle a fluorescent parameter value and a sort decision. Instructions are also included to determine that an individual fluorescent parameter value for an individual particle included in the particles is within the first sort gate. Instructions are also included to associate the individual particle with the first sort gate for presentation via a user interface. Instructions are also included to determine that an individual sort decision for the individual particle corresponds to the second sort gate based at least in part on a comparison between the individual sort decision and the second index sort inclusion value. Instructions are also included to associate the individual particle with the second sort gate for presentation via the user interface.

Implementations of the computer-readable medium may include one or more of the following features. The computer-readable medium where the sort decision is generated by a sorting device configured to sort the particles into the plate based at least in part on the experiment information. The computer-readable medium further having stored thereon instructions which when executed by the processor of the device, cause the device to at least to: receive a geometric shape defining the first sort gate, where the geometric shape is pixelated. The computer-readable medium further having stored thereon instructions which when executed by the processor of the device, cause the device to at least to: receive a request to adjust an axis for a geometric shape defining the first sort gate, where the geometric shape, after the axis is adjusted, is pixelated. The computer-readable medium where the request includes a non-linear transformation to adjust the axis. The computer-readable medium where the first sort gate identifies a set of particles having parameter values distinct from another set of particles identified by the second sort gate. The computer-readable medium further having stored thereon instructions which when executed by the processor of the device, cause the device to at least to: cause display of presentation of a graphic representation of the plate, the graphic representation of the plate including a first area representing the second plate destination; and cause presentation of a graphic indicator for the individual particle within the first area.

DETAILED DESCRIPTION

A common flow sorting technique utilizes drop sorting in which a fluid stream containing linearly segregated particles is broken into drops and the drops containing particles of interest are electrically charged and deflected into a collection tube by passage through an electric field. Current drop sorting systems are capable of forming drops at a rate of 100,000 drops/second in a fluid stream that is passed through a nozzle having a diameter less than 100 micrometers. Drop sorting requires that the drops break off from the stream at a fixed distance from the nozzle tip. The distance is normally on the order of a few millimeters from the nozzle tip and can be maintained for an unperturbed fluid stream by oscillating the nozzle tip at a predefined frequency.

Typically, the linearly segregated particles in the stream are characterized as they pass through an observation point situated just below the nozzle tip. Once a particle is identified as meeting one or more desired criteria, the time at which it will reach the drop break-off point and break from the stream in a drop can be predicted. Ideally, a brief charge is applied to the fluid stream just before the drop containing the selected particle breaks from the stream and then grounded immediately after the drop breaks off. The drop to be sorted maintains an electrical charge as it breaks off from the fluid stream, and all other drops are left uncharged. The charged drop is deflected sideways from the downward trajectory of the other drops by an electrical field and collected in a sample tube. The uncharged drops fall directly into a drain.

Figure 1:
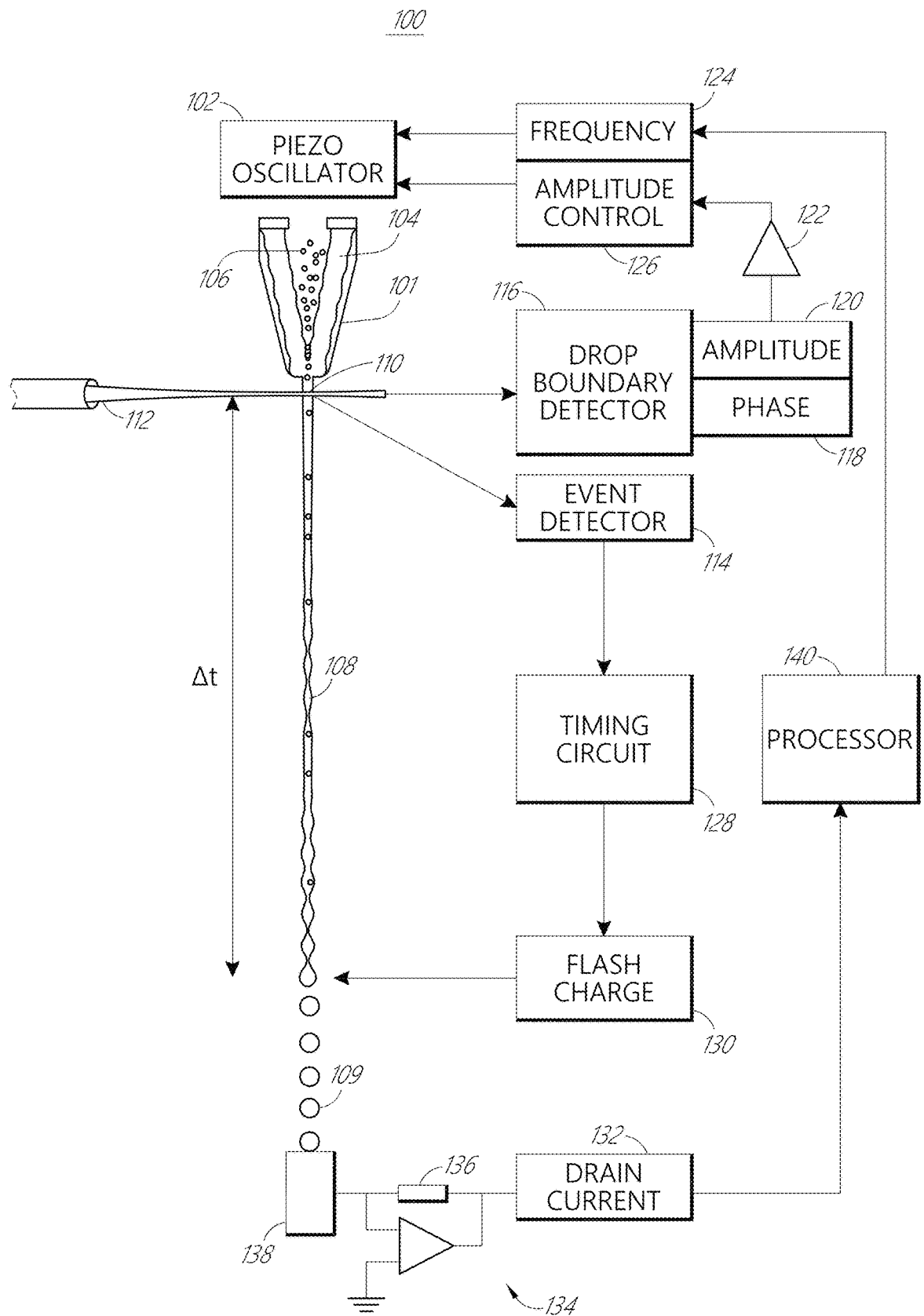
FIG. 1 is a schematic drawing of a cell sorter system 100, in accordance with one embodiment presented herein.

FIG. 1 is a schematic drawing of a cell sorter system 100, in accordance with one embodiment presented herein. As shown in FIG. 1, a drop formation transducer (e.g., piezo-oscillator) 102 is coupled to a fluid conduit, such as nozzle 101. Within nozzle 101, sheath fluid 104 hydrodynamically focuses a sample fluid 106 into a stream 108. Within stream 108, particles (e.g., cells) are lined up in single file to cross a laser-stream intersect 110 (e.g., the LJI), irradiated by an irradiation source (e.g., laser) 112. Vibration of piezo-oscillator 102 causes stream 108 to break into a plurality of drops 109.

In operation, an event detector 114 identifies when a particle of interest (or cell of interest) crosses laser-stream intersect 110. Event detector 114 feeds into timing circuit 128, which in turn feeds into flash charge circuit 130. At the drop break off point, informed by a timed drop delay (Δt), a flash charge is applied to the stream such that the drop of interest carries a charge. The charged drop can then be sorted by activating deflection plates (not shown) to deflect the drop into a collection tube or a multi-well sample plate where a well may be associated with drops of particular interest. As shown in FIG. 1, however, the drops are collected in a drain receptacle 138.

Drop boundary detector 116 serves to automatically determine the phase of the drop drive signal when a particle of interest passes the laser-stream intersect 110. An exemplary drop boundary detector is described in U.S. Pat. No. 7,679,039, which is incorporated herein by reference in its entirety. Drop boundary detector 116 allows the instrument to accurately calculate the place of each detected particle in a drop. Drop boundary detector 116 feeds into an amplitude signal 120 and phase 118 signal, which in turn feeds (via amplifier 122) into an amplitude control circuit 126 and/or frequency control circuit 124. Amplitude control circuit 126 and/or frequency control circuit 124, in turn, controls piezo-oscillator 102.

Cell sorter system 100 further includes a current-to-voltage converter (CVC) 134 coupled to the drain receptacle 138. CVC 134 is configured to detect the presence of a charged particle entering the drain receptacle 138. Resistor 136 sets the volts-per-amp of CVC 134, and provides a voltage that is proportional to current observed at the drain receptacle 138. Drain current is measured in circuit unit 132 and is provided to a processor 140. Processor 140 then feeds into frequency control circuit 124.

In some implementations, sort electronics (e.g., the drop boundary detector 116, the event detector 114, the processor 140) may be coupled with a memory configured to store the detected events and a sort decision based thereon. This information may be included in the event data for a particle. However, as discussed herein, the sorting decision generated by the sort electronics may be different than a sort identified by a workstation based on gates defined for an experiment. As the analysis of event data can be performed on a workstation, this may cause a disconnect between the cell sort information generated by the workstation and the actual sorting for a plate.

In flow cytometry sorting, the use of index-sorting implies additional information is available that links the individual cell events to their destination locations in a plate or slide holder. This information may be used post-acquisition to do additional analysis of where cells are physically located on a plate device. It also allows users to see where those cells are located on bi-variate plots. Current index sort products offer very limited interaction with the data during the analysis phase.

Index sorting is cell sorting where the sorting device may record the sort decision for each event (typically a cell or other particle suspended in a flow stream) and the data is available for post sort analysis. Typically index sorting is performed by detecting a property of a particle (such as color) and directing the particle into a collection plate. The plate may include several plate destinations (e.g., well locations). The soring may include directing the particle to a particular plate location (e.g., well) within the plate. The sorting device may record, in association with an identifier for the event, the destination plate and/or well location. Each sorted event thus has all the measurements from the detectors (PMTs, photodiodes) along with the well location and sort destination. A user can examine a sorted cell's data and correlate it with subsequent operations on the plate (e.g., gene expression derived from sequencing the sorted cells).

Index sorting analysis may require the display of both sorted and unsorted events with plots and statistics. The sorter may perform one or more of: fluorescence compensation, axis transformation (e.g., binomial or other non-linear transformation), or region and gate classification on each event.

A sort mode may be specified for a given sample. The sort mode includes the parameters to control which events are sorted. For example, upon receiving a sample at the sorting device, the sorting device may receive a sort mode to control what properties to use for sorting and where detected values for those properties should be sorted. Sort modes may include a purity mode which may configure the cell sorter to ensure that the desired cell type and only the desired cell type are in the gate. Sort modes may include single cell mode which may configure the cell sorter to ensure that only a single cell is within the droplet. Since there can be uncertainty around the drop boundary of which droplet a cell may be in, often following drops are not sorted even if they could be. For single cell sorting, this may be desirable for certain experiments such as genomic based assays where users may want to correlate gene expression with flow cytometry derived measurements. In such instances, if there were multiple cells within the well, there would be ambiguity as to which cell the gene sequences came from. The sort mode may configure the cell sorter by setting a mask that examines where events fall within the droplet, and surrounding droplets. Some single cell sort mode configurations may include a state machine or examination of a queue of events that fall within a droplet.

In some implementations, a target gate may be used to identify events of interest. A target gate may be provided by selecting an area on a two dimensional plot. Events that are detected with property values within the selected area for the two dimensions are considered within the target gate and may be sorted to a particular location. An event may be within the target gate but under certain sorting modes (e.g., a purity or single cell mode), the event may not be sorted correctly such as if another event is within the same drop in the fluidic stream as the event. In some implementations, this may be referred to as entrainment or cohesion.

As part of recording the sort decisions, the sort electronics of the sorting device may transmit the sort destination along with the event raw data. Event raw data may include a detected property for the event (e.g., reflected light values, fluorescence information, light scatter information, time of the event, a sequence number for the event, sorting device operational characteristics at the time the event was analyzed (e.g., temperature, flow rate, sort mode, etc.), or the like). For index sorting, the current tray, plate, microscope slide, or other physical medium with spatially separated pools where drops including cells may be deposited, coordinates of the location where a cell for a particular event was deposited may also be transmitted.

The sort electronics also transmits the region classifications the sort classification that the digital signal processor (DSP) made for each event. The region classifications may include a bit mask of the current regions sent to the sort electronics.

A region may include a bitmap on a pair of transformed parameters (e.g. CD4-A log vs CD8-A log, or FSC-A linear vs SSC-A linear). Any event where the pair of transformed parameters falls within the set bits of the bitmap is considered to be within the region.

A target gate may consists of a truth table consisting of the combinations of regions and gates such that events having parameters corresponding to the region are considered members (e.g., "within") the associated gate. Other methods of expressing membership of a gate are possible (e.g. a list of regions if the logic consists of an AND combination, use of a postfix logic expression, etc.).

Figure 2:
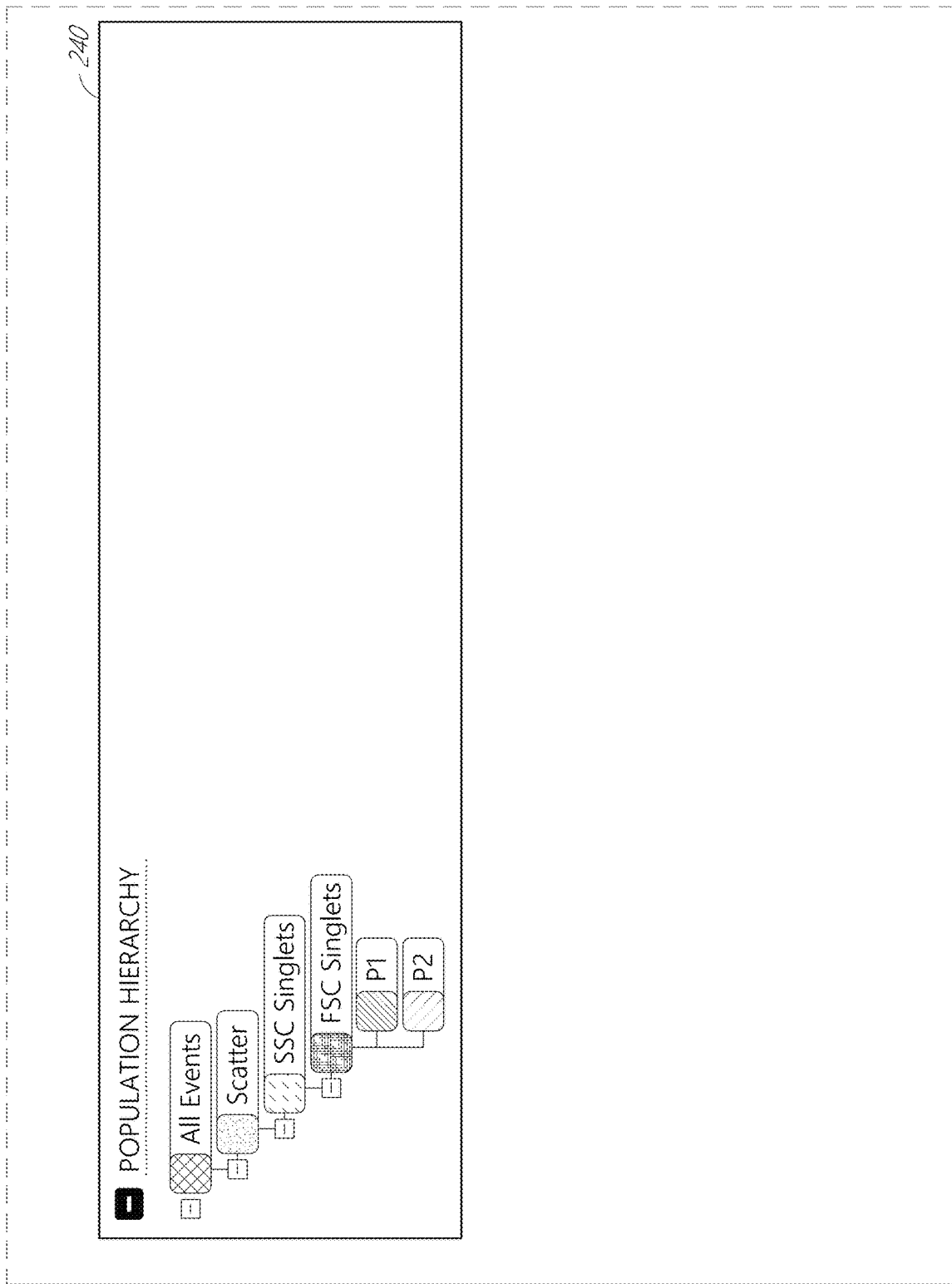
FIG. 2 illustrates a user interface for index sorting.

FIG. 2 illustrates a user interface for index sorting. The user interface 200 includes a hierarchy 240 of gates which may be applied for sorting a sample. The hierarchy 240 may include a root node representing all events for a sample. The root node may then include one or more children nodes. Some child nodes may be selected for sorting. In FIG. 2, singlets with a scatter parameter 1 may be identified for sorting to a specific location (e.g., well, plate, etc.). By activating a control element on the interface, nodes may be added or removed from the hierarchy 240. A node may also be associated with a sort location on a plate. Accordingly, the user interface 200 may be used to define the sort logic for an experiment. Once the experiment has been run and experiment information (e.g., event data) received for an experiment, the user interface 200 may be used to present the event data. To help visualize the sorting, the user interface 200 may include a representation of a target plate 230. The target plate 230 may be a graphical element the provides a visual representation of the wells on a plate that will be used (or has been used) for an experiment. When defining sorting, before the experiment has been run, the target plate 230 or portions thereof may be selectively activated to identify well locations to associate with a gate. For example, a well in the target plate 230 may be selected and then a node in the hierarchy 240 selected to associate with the selected well.

Parameter gates may be specified using one or more population plots 210. At design time, an area of a population plot may be selected to define a population of interest. For example, a polygon may be drawn to identify an area on a two dimensional plot corresponding to x, y parameter values of interest. As a specific example, cells having certain properties may express a known range of parameters. To sort these cells, a selection of the known range may be received to establish a gate for the cells of interest.

Each well within a plate index sort may be assigned a sort gate. A plate may consist of all the same sort gate, or may contain multiple distinct sort gates. Each gate belongs to a gating hierarchy: there is a parent node 'All events' for the experiment, and then the gates are children of the parent or other gates. For example, a gate for CD4 positive cells may consist of 'All Events' which has a child 'Scatter' which has another child 'Singlets' and then a final child 'CD4 positive'. The gate hierarchy may include gates that are used for sorting and gates that are parents of sort gates, along with non-sorting gates. Some gates may be used to sort some wells, but not other wells.

The user interface 200 may include a summary section 220. The summary section 220 may provide a summary of the event data for an experiment. The summary section 220 may be generated by comparing parameter data for events included in the event data with gates associated with the experiment such as those included in the hierarchy 240. The populations shown in the summary section 220 may be associated with respective control elements that, when activated, cause the user interface 200 to display information associated with the selected population(s). For example, if the P1 parameter is selected, the population plots 210 may render only those events associated with the P1 parameter.

There may be finite capacity for regions within the sort electronics and regions that are part of the experiment but not used as part of a sort gate may not be transmitted to the sort electronics. These regions may be used for quality control or other purposes. In some implementations, the sort may change sort gates for each plate well being sorted. For example, a workstation may be configured to determine that the superset of sort gates requires fewer regions than are available through the sort electronics. In such instances, it may be more efficient to transmit all sort regions prior to the experiment and then switch gates for each well. It may also be that the superset requires more regions than are available on the hardware, but by selection of initial sort regions transmitted to the cell sorting device (e.g., flow cytometer), the workstation can minimize the number of sort regions that are replaced with regions from another sort gate when moving to wells with different selected sort gates. For instance, typically there is a common subset of sort regions across sort gates that can be applied. In some implementations, the workstation may transmit non sorting regions to the cell sorting device and receive the cell sorting device's classification of the sort region. The transmission of non-sorting regions may be selectively performed based at least in part on resource constraints such as time to transmit, available sort regions in electronics, or the like.

Analysis of events off the sorting device such as through the user interface 200 via a workstation or other device with more abundant resources. This allows the workstation to perform event analysis at a higher precision than the sort electronics. For example, region bitmaps may be represented on the workstation at a higher resolution than on the sorting device. Interval or rectangular regions defined via the workstation may be evaluated directly by comparing coordinates rather than by mapping to a bitmap. Since an interval region generally compares a parameter measurement to a lower and upper bound, this event analysis on the workstation can be performed without recourse to a bitmap (or a parameter transformation such as logarithmic or bi-exponential). Performing a similar assessment for another measurement may provide a second dimension for defining a rectangle. The bitmap may be consulted when a user rotates a rectangle, thereby changing the dimensions for the gate. In such instances, the workstation may fall back to identifying the gate from the bitmap.

For example, the selection of a gate using a graphical user interface is requires translation from pixel space to parameter value space. Presenting an event faces a conversion from parameter value to pixel space. Near the edge of a polygon, translation may incorrectly identify certain cells due to pixilation error. Pixilation error generally refers to the phenomena whereby smooth curves cannot be rendered using pixels. As such, the gate may appear to a human eye to be smooth, but jagged portions of the boundary line may exist.

This may be desirable for precision and accuracy, but the classification of an event within a gate may differ between the workstation software and the sort electronics. This can be a problem for index sorting because the user may wish to know how the event was sorted and where it appears on one or more dot plots.

Although the discussion references rectangles, similar gate definition may be performed for other shapes. Thus, a variety of geometric shapes could be analyzed by comparing a computation rather than examining a bitmap. For example, an event may be deemed to be within a circular gate if the sum of the squares of the x and y offsets from the center is less than the square of the radius.

The user may wish to visualize the sorted events against unsorted events. The sort electronics may not provide useful classification data on unsorted events—the event may be within the gate but not sorted due to sort mode, or the event may not be within the gate but still appear in other populations of interest to the user that were not classified by the sort electronics.

Figures 2, 3:
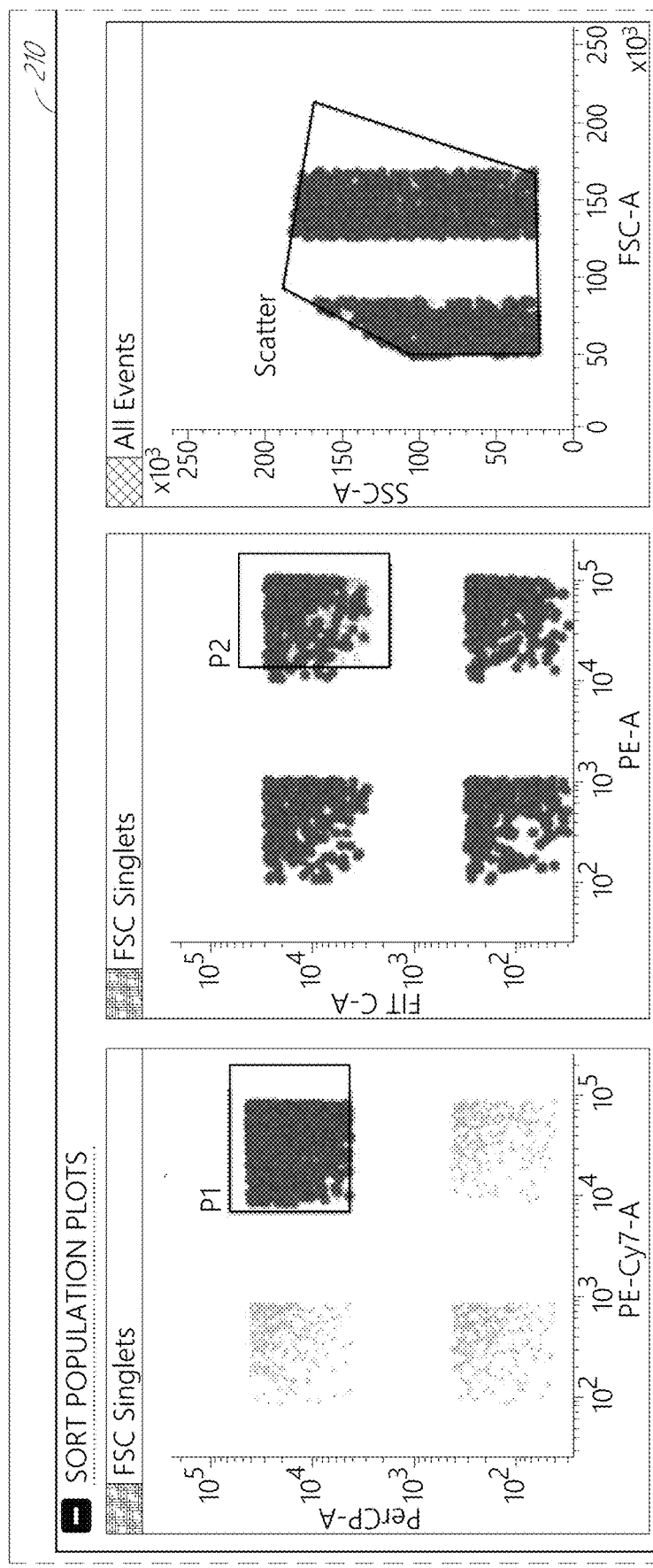
FIG. 3 illustrates an example of pixilation error for a portion of a gate for defining a sort location.

FIG. 3 illustrates an example of pixilation error for a portion of a gate for defining a sort location. A population plot 300 for two parameters (p1 and p2) is shown. The population plot 300 includes a gate 302 which may define a sort population. Because the gate 302 may be defined using a user interface, the nature of pixel based graphics prevents the generation of true smooth polygons.

FIG. 3 includes a magnified view of a portion 350 of the gate 302. The portion 350 shows how the gate 302 may be formed from a series of straight lines. (302-*a*, 302-*b*, and 302-*c*). These lines may be one pixel wide but when viewed at a non-magnified resolution, provide the impression of a circular shape.

The cell parameters may be included in event data received from the flow cytometer. A cell parameter may include a fluorescent parameter value measured for a cell or particle. As shown, the x, y parameter values when rendered on a graphical user interface may lie at or on the boundary of the gate 302. For example, an event 352 may be associated with a parameter value that may lie partially on and partially inside the gate 302. Another event 354 may lie partially on and partially outside the gate 302. In such instances, it is unclear, based on the parameters and user defined gate, whether the cell should be considered within the gate or outside the gate. Event 358 is clearly outside the gate 302, but event 360 presents another questionable case. If the gate 302 were a true circular polygon, the event 360 may be outside the gate but because of the pixelated rendering of the gate 30, the event 360 may be judged by the workstation as being within the gate. This shows some of the ways pixilation error may manifest itself when presenting event data via a user interface.

The gate 320 may also define a population of interest to be sorted. In such instances, additional sort data may be available. For example, if the sorting electronics detected parameters for the event shown in FIG. 3, it may refer to a lookup table generated from the user interface 200 defined gate. The lookup table may translate the pixel locations of the gate boundary to parameter ranges. However, the translation may not represent the same resolution when applied in the sorting electronics. For example, the parameter data for an event may not fall neatly inside or outside a gate, as shown in FIG. 3. In some implementations, these errors may be referred to as in/out effects.

To solve these problems, the event classification from the sort electronics and the workstation software classification may be combined.

One solution may be to have the workstation replicate the classification process performed by the sort electronics exactly. The classification precision would be limited to that of the sorter. The sort decision would also need to be replicated, which requires having the position of the event within the droplet to be known. There would also be a number of numerical problems, e.g. order of operations, use of lookup tables rather than built-in transcendental functions such as natural logarithm. For example, the workstation may program the sorting electronics using the same method as it will use itself such as by generating a bitmap based lookup table. However, the depth of the lookup table or generation of lookup table indices may be performed with improved precision. In some sorting electronics implementations, the bitmap for a log-log plot may waste around a third of the bitmap because a naïve logarithm method was used without an affine transformation. In some implementations, the bottom of the log plot may appears around bin 50 which leaves substantial sort information unused or underused.

Another solution to provide a more accurate assessment of event data may be to fuse the sort decision information from the sort electronics with the workstation software sort classification to produce accurate information for the sorted events. For example, the sort decision information may be encoded by the sorting electronics as the sort destination for the event, the well x and y coordinates within a single word sent with the event measurements. A word generally refers to a value included in the event measurement data.

To provide accurate information for sorted events, such as rendering a visualization user interface or generating analytical values for the events, the workstation software sort classification may be ignored for the sorted events. Instead, the sort electronics classification may be used. Any parent gates of the sort gate can also use the sort electronics classification.

An Exemplary Process

Figures 2, 3, 4:
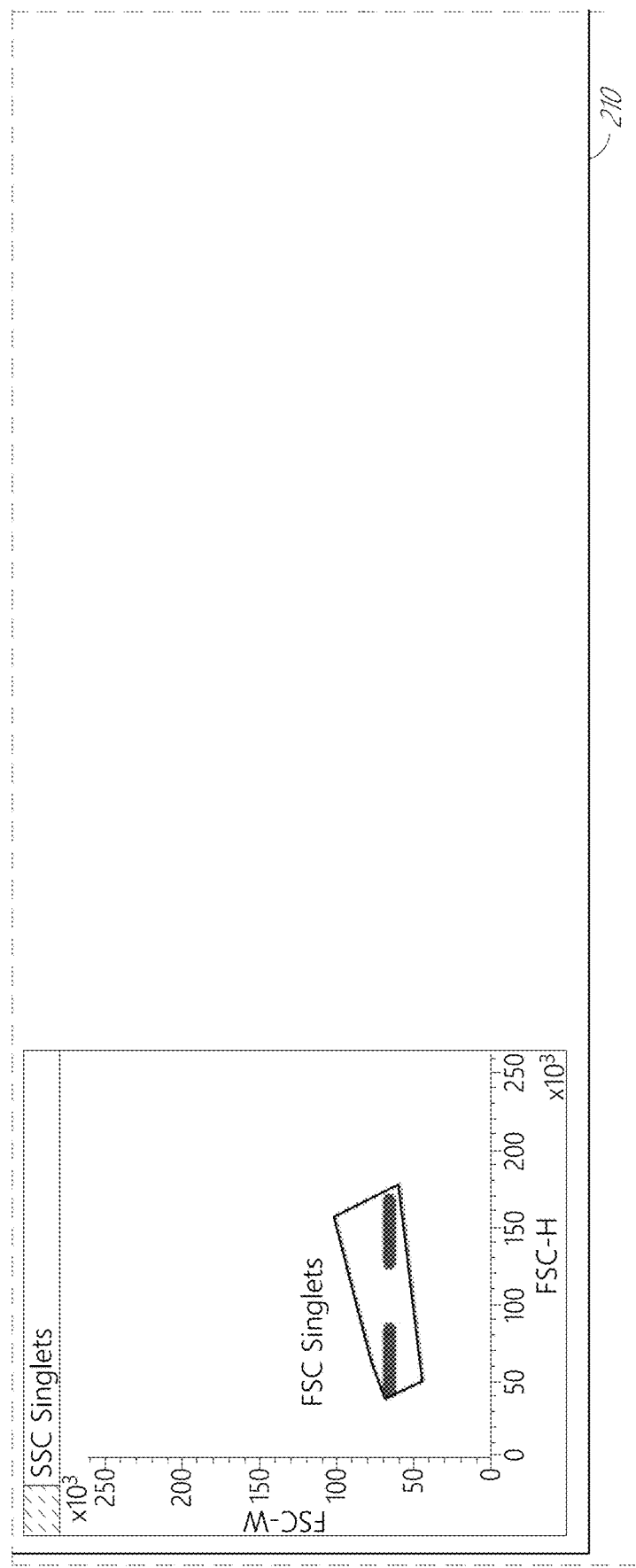
FIG. 4 is a flow diagram illustrating an example method for fused gating for index sorting.

FIG. 4 is a flow diagram illustrating an example method for fused gating for index sorting. The method 400 may be implemented in whole or in part by one or more of the devices described such as a workstation or other flow cytometry device. The method 400 illustrates how sort gates specified via a workstation can be corrected to ensure the events are processed according to the actual sort decisions from a cell sorter rather than solely based on the detected parameters for an event. For example, an index sort bitmap may be generated for each sort gate and the index sort bitmap may include an entry for each well. After the sort gate is evaluated by the workstation, the index sort data from the electronics may be examined and if the corresponding bitmap entry for the well coordinates is set and the event was sorted, then the gate classification from the software is replaced. Another embodiment would be to have the well coordinates look up a table of gates that are affected.

A sort gate includes an inductive sort into any parent nodes in the sort hierarchy. Thus, even though there is only one 'gate' identified by the sort electronics per well, the analysis also inductively includes the parents. The display of events on plots may be correct for the defined sort gate, but rendering plots of populations for parent nodes without an express sort electronics decision may include misclassification due to, for example, the in/out effects discussed. Including the parents by induction solves this. The use of the well coordinates solves the well ordering requirement of the data and the need to calculate and track state changes between wells (e.g., where within the data stream did the next well begin sorting).

Furthermore, the method 400 may improve the defining and analysis of complex computational gates using algorithms other than coordinate comparisons such as bitmaps. For example, a complex hierarchy may be reduced to an approximation using index sort bitmaps. Thus, the method 400 may selectively apply complex computational aspects for events not sorted, but the sorted classification, whether expressly specified or inductively identified, to override.

As another example, given the coordinates transmitted with the other event measurements and sort decisions from, for example, the cell sorting device, a hierarchy of sort gates that were active for a particular well sort can be identified. The method can replace the workstation defined classification with the cell sorting device sort decision across that hierarchy. For child gates sharing common ancestors with the sort gate for the well, the method may replace the ancestors with the sort decision from the cell sorter and for the remaining events, rely on the software classification for the remaining parts of the child gates hierarchy tree.

The method 400 may begin at block 402. At block 402 it may be assumed that a set of sort gates have been defined for a plate. The definition may be based on a preset sort for a sample or target cell of interest. At block 404, event data for a sample may be received. The event data may be received directly from a cell sorter or other flow cytometry device. In some implementations, the event data may be received from a storage medium such as a memory device or data store. The event data may include specific parameter values for each particle detected in the sample as well as sorting information generated by the sort electronics.

At block 406, a set of distinct sort gates used on a plate into which the sample was sorted is identified. The set of distinct sort gates may be identified based on the event data. For example, the event data may include an assay or sample identifier. Based on this identifier, the sort gates applied may be retrieved from a data store. A distinct sort gate may be a composite of two or more sort gates included in a hierarchy such as that shown in FIG. 1. For example, the hierarchy may include a sort gate for singlets and, under singlets, a sort gate for cells associated with parameter 1. In such instances, two unique sort gates would be included in the set, one for singlets with parameter 1 and a second for singles without parameter 1. The hierarchy of gates may be traversed from leaf nodes to the root node for each unique sort gate. No entry in the set will be made if multiple sort gates share the same parent gate.

At block 408, an index sort inclusion bitmap may be generated for each sort gate included in the set of distinct sort gates. The inclusion bitmap may be used to uniquely identify each of the distinct sort gates. For example, if an event is within a gate within the hierarchy, it is also within the parents of the gate within the hierarchy. Thus, the inclusion bitmaps may be generated inclusion bitmaps for the parents of a sort gate to provide the inductive sort logic represented by the hierarchy. Consider the example gate hierarchy shown in Listing 1.

| LISTING 1 |
|---|
| A<br>|--> B<br>|   |--> C<br>|   |--> D<br>|--> E<br>|   |--> F |

If, in the example hierarchy of Listing 1, sorting is performed on gate C then any event that is classified as within gate C is also within gate A and gate B. Gate D may represent some other measurement expressed by some of the 'C' events. Although the sort electronics may not expressly sort events in population associated with gate D, the workstation can infer that the sorting electronics thinks such events are within gate B. Thus the measurement and presentation of events vis-à-vis the actual sorted plate may be more accurate even though it is the workstation and not the cell sorter that identified the classification for events in gate D.

At block 410, each well assigned in the plate may be assigned a sort gate. The assignment may include associating a specific sort gate with a specific well in the plate.

At block 412, the relationship between the well and the sort gate may be persisted by combining the well location to the index sort inclusion data structure (e.g., bitmap). In some implementations, the well location may be specified using a specific portion of the index sort inclusion data structure such as specific bits of the bitmap. For example, assuming the plate is a 6×8 well plate and there are four distinct sort gates, Table 1 provides an example of bitmaps that may be used to represent the index sort inclusion data. The full bitmap may be formed by assigning the first two bits to a binary code for the sort gate and assigning the last six bits to represent a well on the plate.

TABLE 1

| Sort Gate | Binary Code | Well | Binary Code | Full Bitmap |
|---|---|---|---|---|
| 0 | 00 | 1A | 000000 | 00000000 |
| 1 | 01 | 2B | 001010 | 01001010 |
| 2 | 10 | 3C | 010011 | 10010011 |
| 3 | 11 | 4D | 100110 | 11100110 |

At block 414, the workstation may generate a classification of an event included in the event data. The classification may be generated based at least in part on a parameter value for the event and the gate. For example, if the gate defines a population of events having a range of x, y parameter values, the classification for the event may be based on whether the parameter value for the event falls within the range. An event may be classified into one or more groups such as all particles, singlets, or specific parameter groups.

At block 416, a determination is made as to whether the classification generated at block 414 is associated with the gate. If the classification is not associated with the gate, then there may be no discrepancy between the sorting performed by the sorting electronics and the sorting generated by the workstation based on the event data. In such instances, the method 400 may end at block 490.

If the determination at block 416 is affirmative, then it is possible that classification for the event is associated with a gate defining a sort population. At block 418, a determination may be made as to whether event sorting information received from the flow cytometer corresponds to the gate associated with the classification generated for the event at block 414. If not, then there may be no discrepancy between the sorting performed by the sorting electronics and the sorting generated by the workstation based on the event data. In such instances, the method 400 may end at block 490.

If the determination at block 418 is affirmative, the particle associated with the event was sorted differently by the sorting electronics than by the workstation. In such instance, the method 400 may, at block 420, override the classification generated by the workstation with an alternate classification. The alternate classification may be associated with the well location identified by the index sort inclusion bit map. That is, the workstation will honor the actual sorting performed by the soring electronics rather than the sorting generated by the workstation based on the parameter event data for the particle. The overriding may include updating a record stored in memory for the cell or particle associated with the event data. This change may be reflected in the summary panel or other part of the user interface 200 to provide an accurate visualization of the event data based on the sorting actually performed by the sorting electronics. Thus, the sort decision information is fused with the workstation information. The method may then end at block 490. It will be understood that all or a portion of the method 400 may be repeated for fusing sort decision information for other events via the workstation. For example, an experiment may include hundreds of thousands of particles, each associated with multiple parameters which may be used to sort according to a complex hierarchy of gates. Accordingly, aspects of the method 400 may be repeated to classify other events or the same event according to a different set of gates.

Gating may be performed on workstation software at a higher precision than can be achieved on the instrument hardware. For example, bi-exponential transformation may not be supported, such as by the Becton, Dickinson FACSMelody™ hardware, but may be supported by the instrument software so the software approximates the gating by transforming coordinates for the hardware but this may not provide a desired level of precision. Higher precision may be desirable but can cause a problem when index sorting as there may be some small disagreement around gating e.g. hardware uses a lower precision bitmap that has edge effects. The innovative features combine sort decision information with the workstation software gating to reconstruct as much of the event classification as possible from the hardware.

The features provide several non-limiting advantages. For example, the features do not require an exact reproduction of hardware event classification within software. This can be desirable because the electronics platforms may be different versus a workstation CPU and there are many areas where error may be introduced. As another example, the features do not require the separation of the recorded data stream by well. The data does not need to be guaranteed to be in temporal order. Using the well index to look up into a bitmap to see if the gate is applicable to that well does not require analysis state changes or complex conditional logic in computing gate membership.

Exemplary Environments

Figures 2, 3, 4, 5:
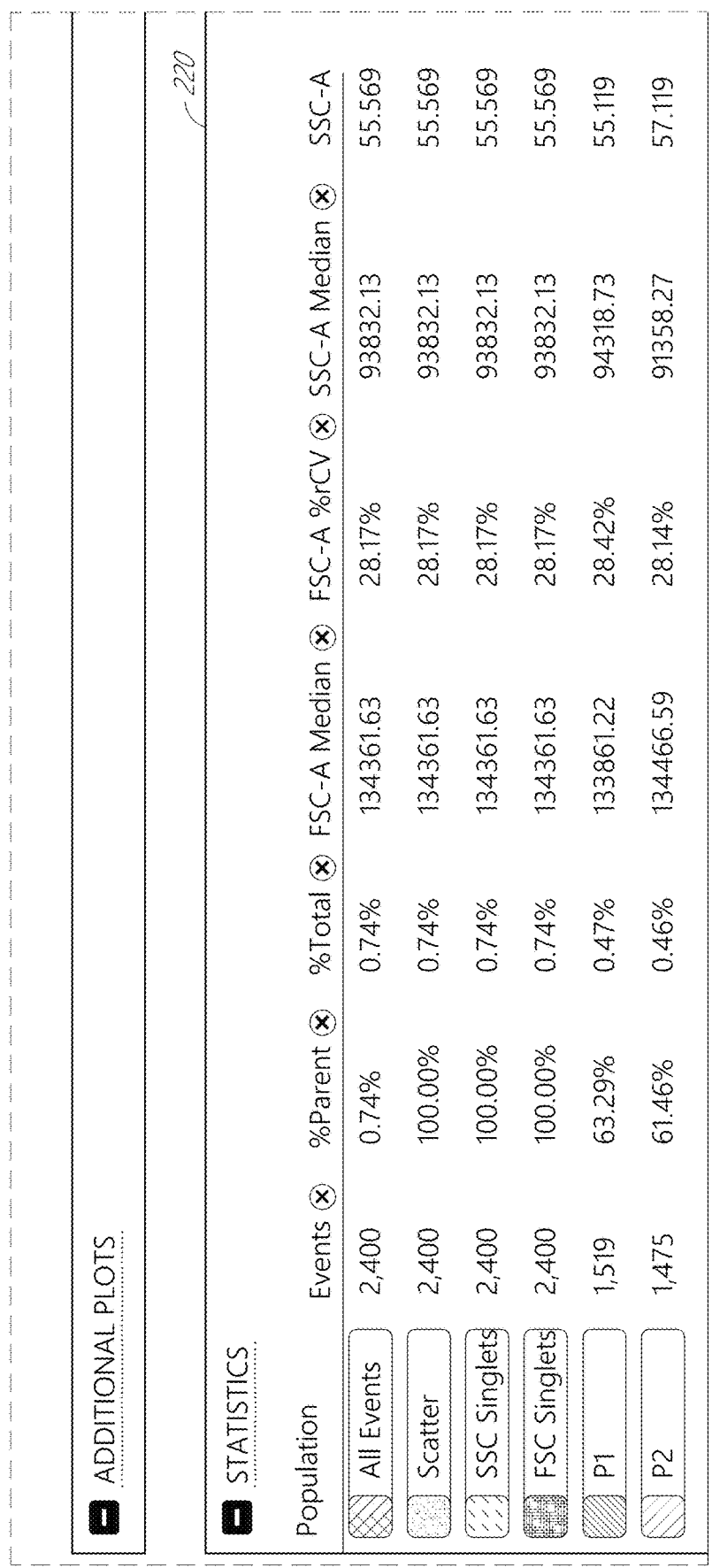
FIG. 5 shows a functional block diagram for one example of a graphics control system for that may implement one or more of the features described.
Figures 2, 3, 4, 5, 6:
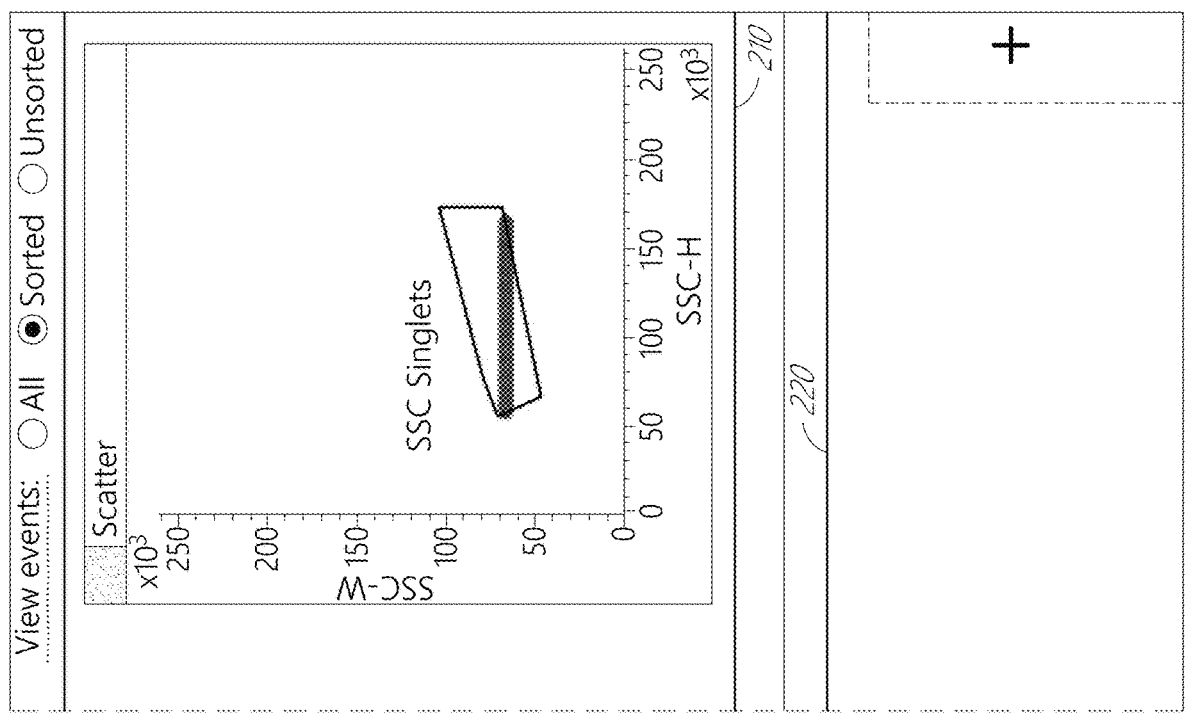
Figure 3:
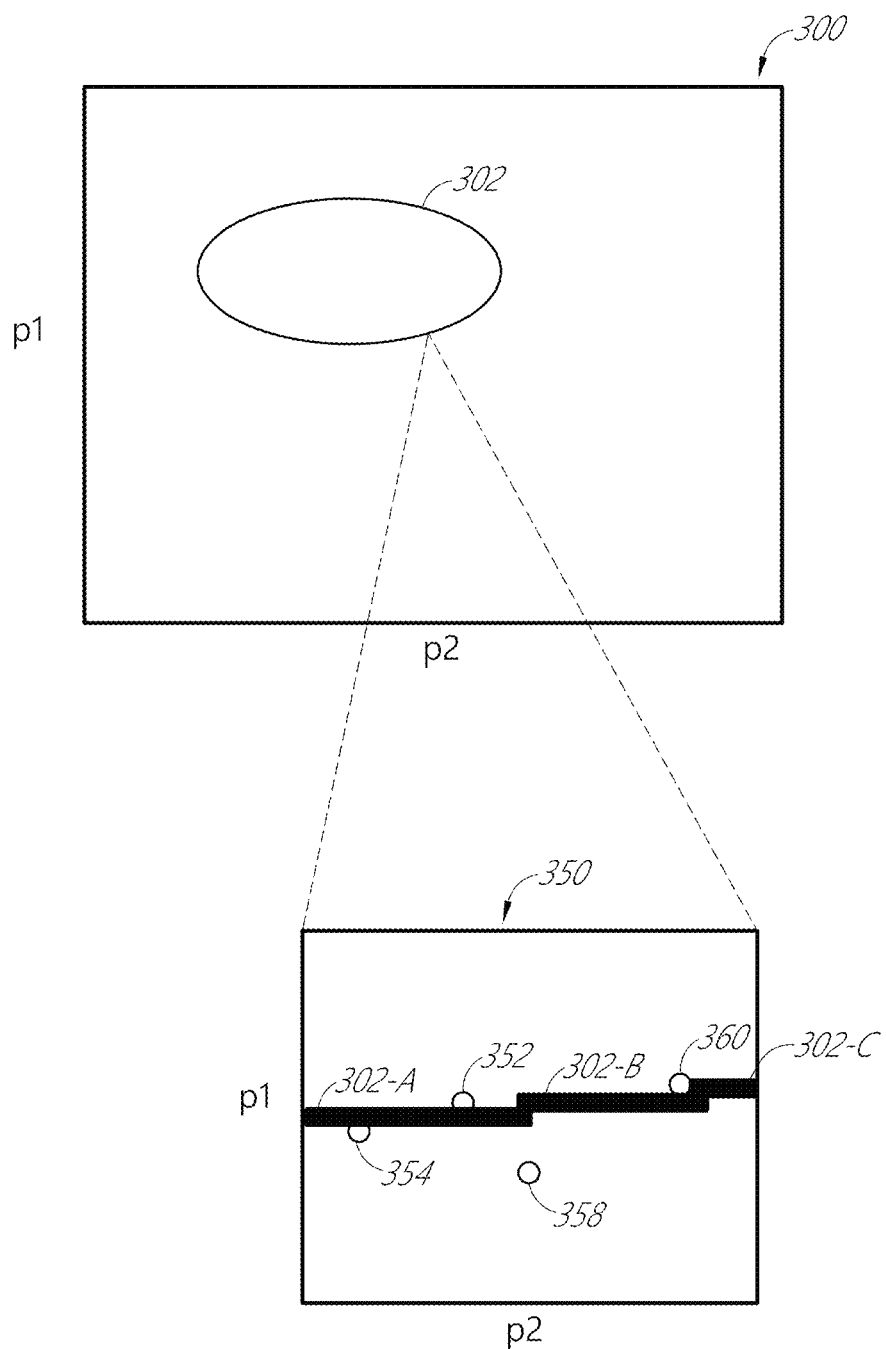
Figure 4:
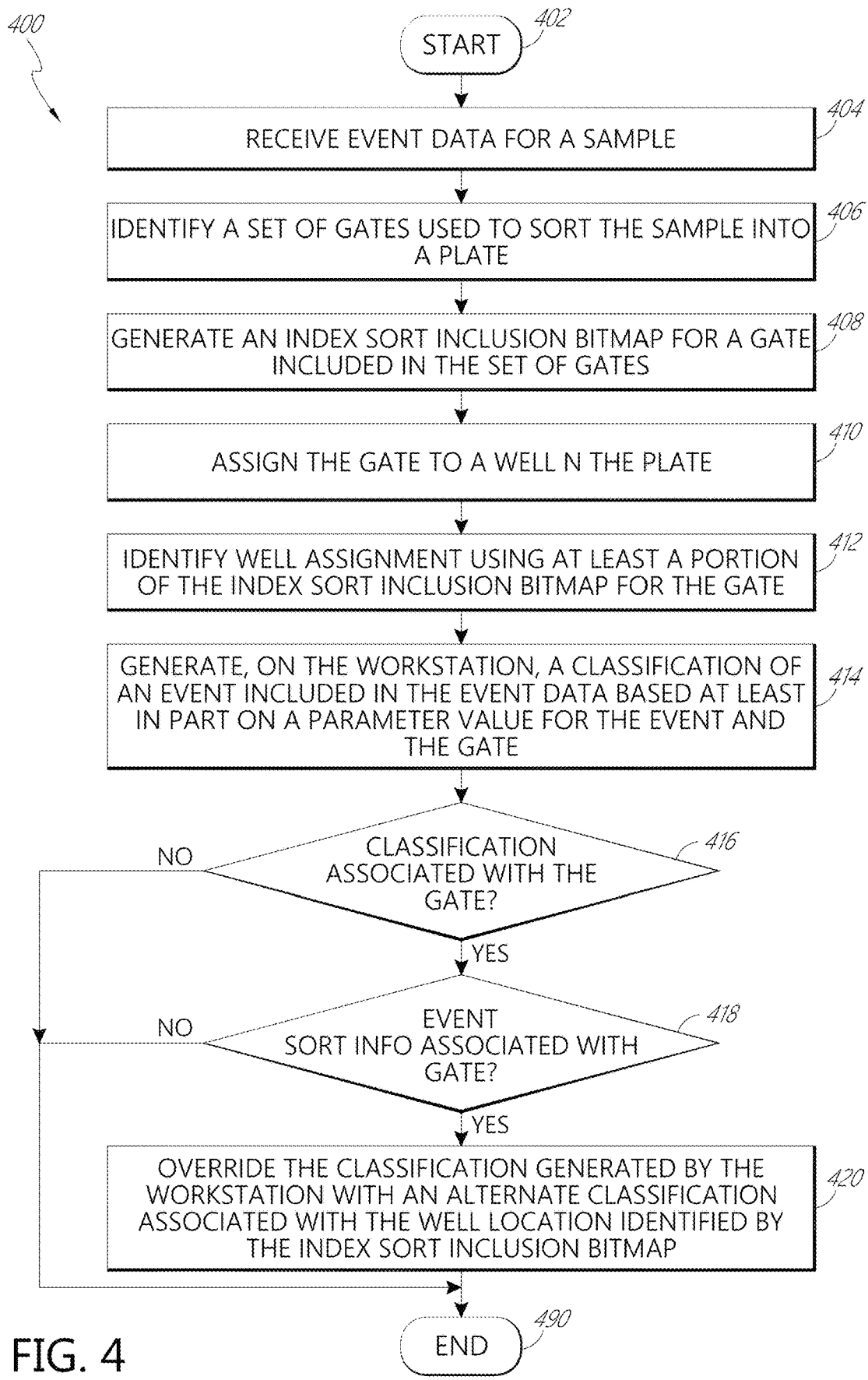
Figure 5:
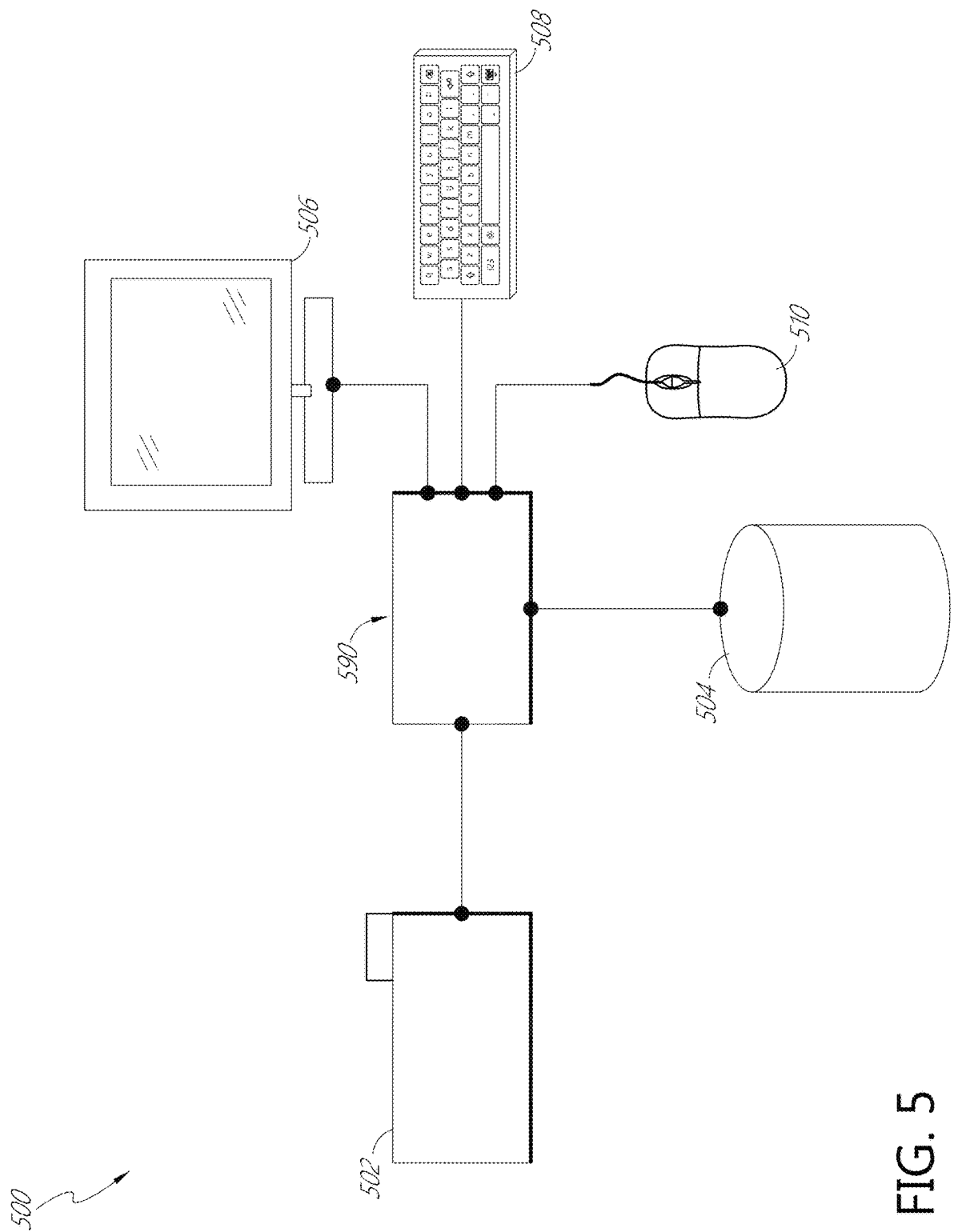

FIG. 5 shows a functional block diagram for one example of a graphics control system for that may implement one or more of the features described.

A flow cytometer 502 may be configured to acquire flow cytometric events. For example, flow cytometer 502 may generate flow cytometric event data. The flow cytometer 502 may be configured to provide flow cytometric events to the graphics controller 590. A data communication channel may be included between the flow cytometer 502 and the graphics controller 590. The flow cytometric events may be provide to the graphics controller 590 via the data communication channel.

The graphics controller 590 may be configured to receive flow cytometric events from the flow cytometer 502. The flow cytometric events received from the flow cytometer 502 may include flow cytometric event data. The graphics controller 590 may be configured to provide a graphical display including a first plot or other visualization (e.g., wells) of flow cytometric events to a display device 506. The graphics controller 590 may be further configured to render a gate around a population of flow cytometric events shown by the display device 506, overlaid upon the first plot. Additionally, the graphics controller 590 may be further configured to display the flow cytometric events on the display device 506 within the gate differently from other events in the flow cytometric events outside of the gate. For example, the graphics controller 590 may be configured to render the color of flow cytometric events contained within the gate to be distinct from the color of flow cytometric events outside of the gate. The display device 506 may be implemented as a monitor, a tablet computer, a smartphone, or other electronic device configured to present graphical interfaces.

The graphics controller 590 may be configured to receive a selection signals identifying activation of a control element such as a button, drawing of a gate, or keyboard input from a first input device. For example, the input device may be implemented as a mouse 510. The mouse 510 may initiate a gate selection signal to the graphics controller 590 identifying the gate to be displayed on or manipulated via the display device 506 (e.g., by clicking on or in the desired gate when the cursor is positioned there). If the visualizations include a well display, selection of particular wells may be included in the gate selection signal.

The first and second input devices may be implemented as one or more of the mouse 510, a keyboard 508, or other means for providing an input signal to the graphics controller 590 such as a touchscreen, a stylus, an optical detector, or a voice recognition system. Some input devices may include multiple inputting functions. In such implementations, the inputting functions may each be considered an input device. For example, as shown in FIG. 5, the mouse 510 may include a right mouse button and a left mouse button, each of which may generate a triggering event.

The triggering event may cause the graphics controller 590 to alter the manner in which the data is displayed or which portions of the data is actually displayed on the display device 506 or both at the same time.

In some embodiments, the graphics controller 590 may be configured to detect when gate selection is initiated by the mouse 510. The graphics controller 590 may be further configured to automatically modify one or more interface elements to respond to the selection/input as described. The alteration may include loading event data from a specified source and presenting a user interface, such as the user interface 200 shown in FIG. 2 based at least in part on fused sort information.

The graphics controller 590 may be connected to a storage device 504. The storage device 504 may be configured to receive and store flow cytometric events from the graphics controller 590. The storage device 504 may also be configured to receive and store flow cytometric event data from the graphics controller 590. The storage device 504 may be further configured to allow retrieval of flow cytometric events and flow cytometric event data by the graphics controller 590.

A display device 506 may be configured to receive display data from the graphics controller 590. The display data may comprise plots of flow cytometric events and gates outlining sections of the plots. The display device 506 may be further configured to alter the information presented according to input received from the graphics controller 590 in conjunction with input from the flow cytometer 502, the storage device 504, the keyboard 508, and/or the mouse 510.

Further Embodiments

Aspects of the description focus on flow cytometers and flow cytometry event data. In some embodiments, the event data may correspond to other quantitative biological data indicating expression of a particular protein or gene. For example, the event data may indicate the presence of an mRNA sequence within a cell or across a mixed population of cells. The event data may identify an absolute number of gene transcripts of a transcriptome for a cell or cells. Presentation of the event data may be adjusted per cell or per gene expression to provide different perspectives on populations of event data of particular interest (e.g., associated with a particular mRNA sequence, taken from a specific cell, etc.). The event data may be generated using massively parallel single cell analytic features such as those described in U.S. Pat. No. 9,567,645 which is hereby incorporated by reference in its entirety. One commercially available single-cell analysis system is the Becton, Dickinson Rhapsody™ hardware by Becton, Dickinson and Company of Franklin Lakes, N.J. The features discussed may be applied to reconcile sorting decisions based on gene expression.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

As used herein, "system," "instrument," "apparatus," and "device" generally encompass both the hardware (e.g., mechanical and electronic) and, in some implementations, associated software (e.g., specialized computer programs for graphics control) components.

As used herein, an "event" generally refers to the data measured from a single particle, such as cells or synthetic particles. Typically, the data measured from a single particle include a number of parameters, including one or more light scattering parameters, and at least one fluorescence intensity parameters. Thus, each event is represented as a vector of parameter measurements, wherein each measured parameter corresponds to one dimension of the data space. In some biological applications, event data may correspond to quantitative biological data indicating expression of a particular protein or gene.

As used herein, a "population", or "subpopulation" of particles, such as cells or other particles, generally refers to a group of particles that possess optical properties with respect to one or more measured parameters such that measured parameter data form a cluster in the data space. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, e.g., with respect to a subset of the measured parameters, which corresponds to populations that differ in only a subset of the measured parameters.

As used herein, a "gate" generally refers to a boundary identifying a subset of data of interest. In cytometry, a gate may bound a group of events of particular interest. The group of events may be referred to a population. Further, as used herein, "gating" may generally refer to the process of defining a gate for a given set of data such as a via a user interface or plate and well selections.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed graphics processor, which may include one or more processors, such as one or more digital signal processors (DSPs), configurable microprocessors, an application specific integrated circuits (ASICs), field programmable logic arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a specialized graphic control card.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A computer-implemented method of fused gating for index sorting, the method comprising:
   under control of one or more electronic processors:
      receiving, at a workstation from a memory, experiment information identifying:
         (i) a first sort gate,
         (ii) a first plate destination for particles identified within the first sort gate on a collection plate,
         (iii) a second sort gate, and
         (iv) a second plate destination for particles identified within the second sort gate on the collection plate;
      generating, at the workstation, a first index sort inclusion bitmap identifying first plate locations on the collection plate using the first sort gate;
      generating, at the workstation, a second index sort inclusion bitmap identifying second plate locations on the collection plate using the second sort gate;
      receiving, at the workstation, event data for the particles, the event data including for each particle a fluorescent parameter value and a sort decision of a sorting device;
      determining, via the workstation, that an individual fluorescent parameter value for an individual particle included in the particles is within the first sort gate;
      associating the individual particle with the first sort gate for presentation via a user interface;

determining, via the workstation, that an individual sort decision for the individual particle corresponds to the second sort gate based at least in part on a comparison between the individual sort decision and the second index sort inclusion bitmap; and associating the individual particle with the second sort gate for presentation via the user interface.

2. The computer-implemented method of claim 1, wherein the sort decision is generated by a sorting device configured to sort the particles into the collection plate based at least in part on the experiment information.

3. The computer-implemented method of claim 1, further comprising: receiving, at the workstation, a geometric shape defining the first sort gate, wherein the geometric shape is pixelated.

4. The computer-implemented method of claim 1, further comprising: receiving, at the workstation, a request to adjust an axis for a geometric shape defining the first sort gate, wherein the geometric shape, after the axis is adjusted, is pixelated.

5. The computer-implemented method of claim 4, wherein the request includes a binomial transformation to adjust the axis.

6. The computer-implemented method of claim 1, wherein the first sort gate identifies a set of particles having parameter values distinct from another set of particles identified by the second sort gate.

7. The computer-implemented method of claim 1, wherein associating the individual particle with the first sort gate is based at least in part on a determination, with respect to the first sort gate, whether the individual particle was classified differently by the sorting device than by the workstation.

8. The computer-implemented method of claim 1, wherein associating the individual particle with the second sort gate is based at least in part on a determination, with respect to the second sort gate, whether the individual particle was classified differently by the sorting device than by the workstation.

9. An apparatus comprising:
a particle analyzer configured to acquire quantitative biological event data;
one or more processors in communication with the particle analyzer, the one or more processors configured to:
receive, from a memory, experiment information identifying:
(i) a first sort gate,
(ii) a first plate destination for particles identified within the first sort gate,
(iii) a second sort gate, and
(iv) a second plate destination for particles identified within the second sort gate;
generate a first index sort inclusion bitmap uniquely identifying the first sort gate;
generate a second index sort inclusion bitmap uniquely identifying and the second sort gate;
receive, from the particle analyzer, event data for the particles, the event data including for each particle a fluorescent parameter value and a sort decision;
determine that an individual fluorescent parameter value for an individual particle included in the particles is within the first sort gate;
associate the individual particle with the first sort gate for presentation via a user interface;
determine that an individual sort decision for the individual particle corresponds to the second sort gate based at least in part on a comparison between the individual sort decision and the second index sort inclusion bitmap; and
associate the individual particle with the second sort gate for presentation via the user interface.

10. The apparatus of claim 9, wherein the sort decision is generated by the particle analyzer, wherein the particle analyzer is configured to sort the particles into the plate based at least in part on the experiment information.

11. The apparatus of claim 9, wherein the one or more processors are further configured to: receive a geometric shape defining the first sort gate, wherein the geometric shape is pixelated.

12. The apparatus of claim 9, wherein the one or more processors are further configured to: receive a request to adjust an axis for a geometric shape defining the first sort gate, wherein the geometric shape, after the axis is adjusted, is pixelated.

13. The apparatus of claim 12, wherein the request includes a non-linear transformation to adjust the axis.

14. The apparatus of claim 9, wherein the first sort gate identifies a set of particles having parameter values distinct from another set of particles identified by the second sort gate.

15. The apparatus of claim 9, wherein the one or more processors are further configured to:
cause display of a graphic representation of the plate, the graphic representation of the plate including a first area representing the second plate destination; and
cause display of a graphic indicator for the individual particle within the first area.

16. A non-transitory computer-readable storage medium having stored thereon instructions which when executed by a processor of a device, cause the device to at least:
receive, from a memory, experiment information identifying:
(i) a first sort gate,
(ii) a first plate destination for particles identified within the first sort gate,
(iii) a second sort gate, and
(iv) a second plate destination for particles identified within the second sort gate;
generate a first index sort inclusion bitmap uniquely identifying the first sort gate;
generate a second index sort inclusion bitmap uniquely identifying and the second sort gate;
receive, from a particle analyzer, event data for the particles, the event data including for each particle a fluorescent parameter value and a sort decision;
determine that an individual fluorescent parameter value for an individual particle included in the particles is within the first sort gate;
associate the individual particle with the first sort gate for presentation via a user interface;
determine that an individual sort decision for the individual particle corresponds to the second sort gate based at least in part on a comparison between the individual sort decision and the second index sort inclusion bitmap; and
associate the individual particle with the second sort gate for presentation via the user interface.

17. The non-transitory computer-readable storage medium of claim 16, wherein the sort decision is generated by a sorting device configured to sort the particles into the plate based at least in part on the experiment information.

18. The non-transitory computer-readable storage medium of claim 16, further having stored thereon instructions which when executed by the processor of the device, cause the device to at least to: receive a geometric shape defining the first sort gate, wherein the geometric shape is pixelated.

19. The non-transitory computer-readable storage medium of claim 16, further having stored thereon instructions which when executed by the processor of the device, cause the device to at least to: receive a request to adjust an axis for a geometric shape defining the first sort gate, wherein the geometric shape, after the axis is adjusted, is pixelated.

20. The non-transitory computer-readable storage medium of claim 19, wherein the request includes a non-linear transformation to adjust the axis.

21. The non-transitory computer-readable storage medium of claim 16, wherein the first sort gate identifies a set of particles having parameter values distinct from another set of particles identified by the second sort gate.

22. The non-transitory computer-readable storage medium of claim 16, further having stored thereon instructions which when executed by the processor of the device, cause the device to at least to:
    cause display of presentation of a graphic representation of the plate, the graphic representation of the plate including a first area representing the second plate destination; and
    cause presentation of a graphic indicator for the individual particle within the first area.

\* \* \* \* \*